Patented Apr. 5, 1932

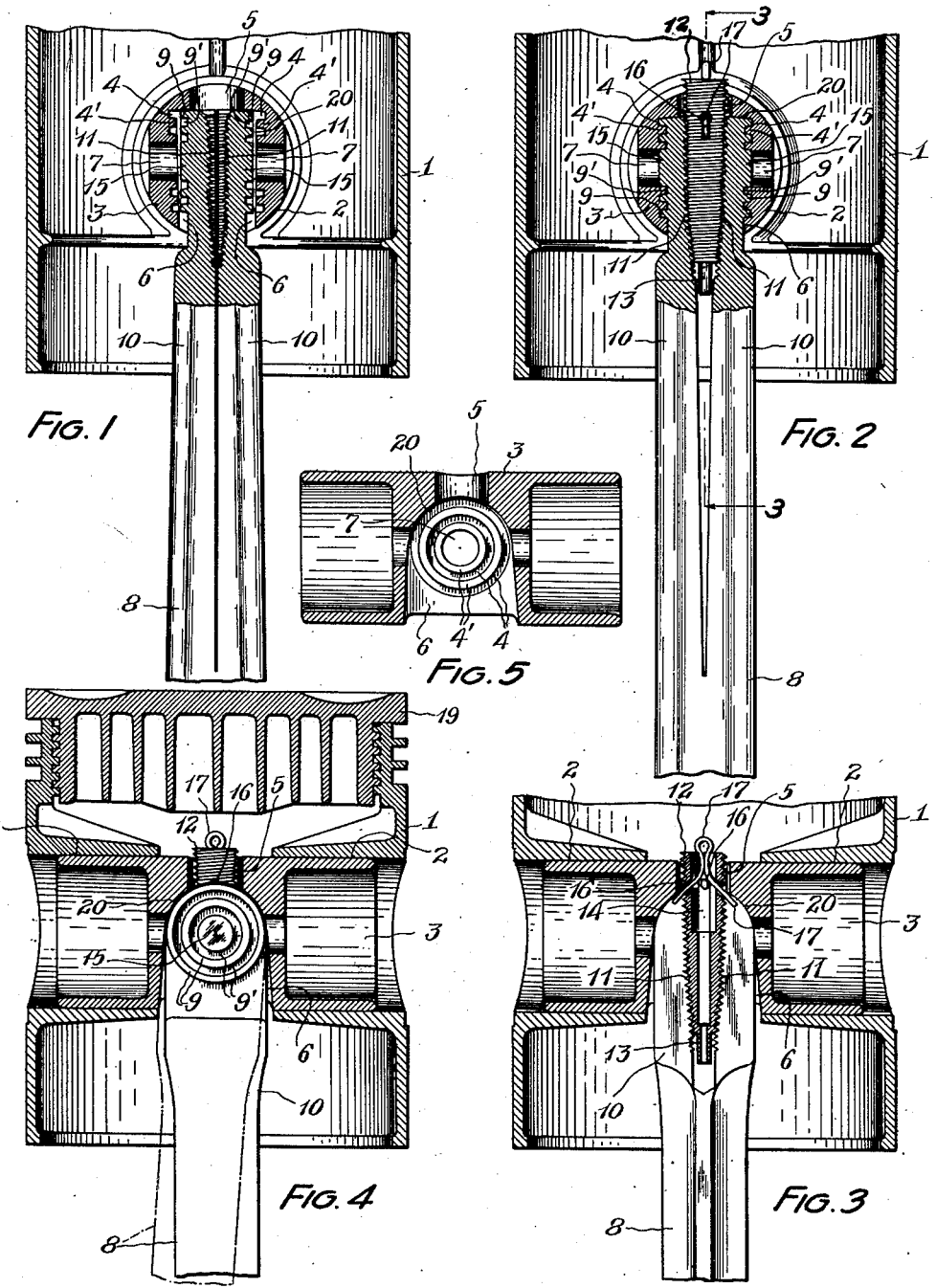

1,852,663

UNITED STATES PATENT OFFICE

KINCHEN N. MATTHEWS, OF CLEVELAND HEIGHTS, OHIO

PISTON

Application filed April 20, 1931. Serial No. 531,409.

My invention particularly relates to pistons having connections suitable for the securing thereof to a connecting rod so as to make the piston self-aligning, and is particularly applicable to that class of internal combustion engines which have removable cylinder heads and pistons provided with removable heads, such as is shown for example in U. S. Letters Patent Nos. 1,618,600 and 1,618,601, issued to me February 22, 1927. More particularly, the invention relates to special improvements in a piston having the aforementioned characteristics and shown, described and claimed in my pending application for U. S. Letters Patent, Serial No. 169,790.

The present invention specifically relates to improvements in the connection between the piston and the connecting rod, its object being to assure the integrity and secureness of said connection while preserving a simplified structure of a small number of parts and at the same time preserving the desired self-aligning features.

The annexed drawings and the following description set forth in detail certain means embodying my invention, such means constituting, however, but one of the various mechanical forms in which the principle of the invention may be illustrated.

In said annexed drawings:

Figure 1 is a broken axial section of a piston and piston rod embodying the improvements, the plane of section being at right angles to the wrist pin axis, and the piston rod being shown partially in side elevation. In this view an upper split collapsible portion of a connecting rod is shown in its normally collapsed condition, and the means for expanding the same to engage a co-operating wrist pin connecting element are not shown;

Figure 2 is a view similar to Figure 1 in which the expanding means for the split connecting rod portion are shown, and the co-operating elements of the connecting rod and wrist pin are shown in engaged position;

Figure 3 is a broken axial section, taken in the plane indicated by the line 3—3, Figure 2;

Figure 4 is a view similar to that shown in Figure 3 except that the removable piston head is also shown and the connecting rod is shown in elevation instead of in section, the self-aligning capacity of the connecting rod being indicated in broken lines; and Figure 5 is a detached view of the wrist pin, taken in axial section, showing particularly the wrist pin bearing element adapted to engage with a co-operating connecting rod element to form the improved connection between these members.

In the illustrated embodiment of my invention, the piston 1 is provided with the opposed cylindrical transverse bearings 2 in which are seated the respective ends of a chambered wrist pin 3. The latter is formed at the top with a cylindrical hole 5, and at the bottom with an opening 6, both of which communicate with the transverse chamber of the wrist pin. The connecting rod 8 is passed through the bottom opening 6 so as to enter the chamber 20 of the wrist pin, the length of the opening 6 being somewhat greater than the longer side of that portion of the connecting rod 8 which passes therethrough so as to permit the connecting rod to oscillate upon an axis perpendicular to the wrist pin axis (see broken lines in Figure 4) as well as to be capable of oscillating in the ordinary manner with the wrist pin axis. The nature of the connection between the wrist pin and the connecting rod whereby this action is possible will be hereinafter fully explained.

The opposed internal faces of the wrist pin 3 are formed with coaxial spaced grooves 4 and alternate tongues 4', which are preferably of annular formation, and adapted to engage alternate coaxial tongues and grooves 9 and 9' respectively, also preferably of annular formation, and formed upon the laterally projecting outer portions of split end connecting rod parts 10. Preferably, the grooves 4 and 9 and the tongues 4' and 9' are somewhat beveled, as shown in the accompanying drawings, whereby wedging such as would prevent their separation one from the other is obviated, the bottoms of the respective tongues being somewhat wider than the tops thereof and the tops of the respective grooves being correspondingly wider than the bottoms thereof, as will be apparent from an inspection of the drawings. Furthermore, the wrist pin body is intersected by cylindrical holes 7 disposed centrally of the grooves 4 and tongues 4' and engaged by cylindrical laterally extended hub portions 15 formed upon the split end connecting rod parts 10. The normal condition of the split end sections 10 of the connecting rod 8 is a collapsible one, such as shown in Figure 1, and in this collapsed condition the connecting rod end can be passed through the opening 6 into the chamber 20 of the wrist pin 3. The opposed upper end portions of the inner surfaces of the rod sections 10 are formed with conical screw threads 11. The upper opening 5 in the wrist pin body permits the introduction of a conical or tapered screw 12 which is adapted to engage the threads 11 and thus expand the connecting rod end sections 10 to cause the tongues 9 and grooves 9' thereof to engage the grooves 4 and tongues 4', respectively, of the opposed bearing portions formed in the wrist pin. It is evident from an inspection of the drawings that when the co-operating connecting rod and wrist pin elements are thus engaged, the rod sections 10 cannot be withdrawn from their seats or withdrawn through the opening 6. I wish to direct particular attention to the fact that the described improved construction of joint between the wrist pin and connecting rod end insures an extremely secure and permanent connection.

In order to permit easy insertion of the screw 12 and the proper starting engagement of its threads with the threads 11, the hole 5 in the wrist pin body 3 is somewhat enlarged, and the lower end 13 of the screw 12 is of reduced cross-section so as to form a pilot. The top portion of the screw 12 is provided with a polygonal recess 14, shown in Figure 3, for the reception of a tool for turning it during assembling. In order that the screw 12 may be locked without any possibility of the loosening thereof, I provide, if desired, an annular horizontal series of holes 16 in the screw body 12 adapted to permit the passage therethrough of the split ends of a cotter pin 17, which ends can be slightly bent apart and inserted within the recess 14 and which upon the cotter pin 17 being pressed into the hole 14 will be bent outwardly and through the holes 16, as shown in Figure 3.

As above stated, the connecting rod 8, in addition to its oscillating movement with the wrist pin axis, is also capable of angular adjustment with relation to the wrist pin and the piston, in a plane at right angles to the plane of the aforesaid oscillation, the nature of the joint between the wrist pin 3 and the connecting rod sections 10, and the length of the opening 6 permitting such right angular play. Thus, in the event of end play in the crank shaft, or undue wear on the sides of the connecting rod bearing, or a bent connecting rod, there will be an automatic aligning or adjusting movement of the connecting rod so that the piston will travel truly, without side strain and hence without abnormal wear in the cylinder such as would take place without said self-aligning capacity of the connecting rod 8.

My improvements are particularly applicable to cylinders and pistons having detachable heads. Such an assembly is well known and I illustrate the removable piston head by the co-operating screw-threaded piston body 1 and head 19 shown in Figure 4. When it is desired to remove the piston 1 from the cylinder, it is necessary only to remove the cylinder head and the detachable piston head 19 and then take out the cotter pin 17 and the screw 12, which permits the sections 10 of the upper end of the connecting rod 8 automatically to assume their normal collapsed position, after which the piston 1 can be lifted from the upper connecting rod end and out through the top of the cylinder.

What I claim is:

1. The combination of a piston provided with a transverse bearing; a wrist pin mounted in said bearing and formed with an internal arcuate groove; a connecting rod having a split end portion and a laterally projecting tongue engaging the groove in the wrist pin; and means for expanding said split rod end to effect the engagement of said tongue and groove.

2. The combination of a piston provided with a transverse bearing; a wrist pin mounted in said bearing and formed with an internal tapered arcuate groove; a connecting rod having a split end portion and a laterally projecting tapered tongue engaging the groove in the wrist pin; and means for expanding said split rod end to effect the engagement of said tongue and groove.

3. The combination of a piston provided with a transverse bearing; a wrist pin mounted in said bearing and formed with an internal annular groove; a connecting rod having a split end portion and a laterally projecting tongue engaging the groove in the wrist pin; and means for expanding said split rod end to effect the engagement of said tongue and groove.

4. The combination of a piston provided with a transverse bearing; a wrist pin mounted in said bearing and formed with a plurality of arcuate coaxial grooves; a connecting rod having a split end portion and laterally projecting tongues respectively engaging the grooves of the wrist pin; and means for expanding said split end rod portion to effect the engagement of said tongues and grooves.

5. The combination of a piston provided with a transverse bearing; a wrist pin mounted in said bearing and formed with a plurality of tapered arcuate coaxial grooves; a connecting rod having a split end portion and laterally projecting tapered tongues respectively engaging the grooves of the wrist pin; and means for expanding said split end rod portion to effect the engagement of said tongues and grooves.

6. The combination of a piston provided with a transverse bearing; a wrist pin mounted in said bearing and formed with a plurality of annular coaxial grooves; a connecting rod having a split end portion and laterally projecting tongues respectively engaging the grooves of the wrist pin; and means for expanding said split end rod portion to effect the engagement of said tongues and grooves.

7. The combination of a piston provided with a transverse bearing; a wrist pin mounted in said bearing and formed with a plurality of annular tapered coaxial grooves; a connecting rod having a split end portion and laterally projecting tapered tongues respectively engaging the grooves of the wrist pin; and means for expanding said split end rod portion to effect the engagement of said tongues and grooves.

8. The combination of a piston provided with a transverse bearing; a wrist pin mounted in said bearing and formed with a transverse recess and opposed internal grooves, said wrist pin having an end opening of less width than the distance between the bottom surfaces of said opposed grooves; a connecting rod having split end portions and a tongue laterally projecting from each portion and engaging the respective grooves in the wrist pin; and means for expanding said split end rod portions to effect the engagement of said tongues and grooves.

9. The combination of a piston provided with a transverse bearing; a wrist pin mounted in said bearing and formed with a transverse recess and opposed internal tapered grooves, said wrist pin having an end opening of less width than the distance between the bottom surfaces of said opposed grooves; a connecting rod having split end portions and a tapered tongue laterally projecting from each portion and engaging the respective grooves in the wrist pin; and means for expanding said split end rod portions to effect the engagement of said tongues and grooves.

10. The combination of a piston provided with a transverse bearing; a wrist pin mounted in said bearing and having an internal seat formed by opposed annular grooves, the wrist pin having a transverse recess, and also an end opening of less width than the distance between the bottom surfaces of the opposed grooves; a connecting rod having a split end portion and tongues laterally projecting from the respective parts of said rod end portion and engaging said grooves respectively, the opposing internal surfaces of said split end rod parts being formed with tapered threads; and a tapered screw engaging said threads to expand said rod end to effect the engagement of said tongues with said grooves.

11. The combination of a piston provided with a transverse bearing; a wrist pin mounted in said bearing and formed with a horizontal bearing portion, the axis of which is at right angles to the axis of the piston bearing; and a connecting rod detachably secured to said wrist pin and formed with an integral journal portion mounted in the wrist pin bearing, the co-operating bearing and journal portions of said wrist pin and connecting rod being comprised of engaging and co-operating annular tongues and grooves formed respectively upon and in the wrist pin and connecting rod.

12. The combination of a piston provided with a transverse bearing; a wrist pin mounted in said bearing and formed with a horizontal bearing portion, the axis of which is at right angles to the axis of the piston bearing; and a connecting rod detachably secured to said wrist pin and formed with an integral journal portion mounted in the wrist pin bearing, the co-operating bearing and journal portions of said wrist pin and connecting rod being comprised of engaging and co-operating annular tapered tongues and grooves formed respectively upon and in the wrist pin and connecting rod.

13. The combination of a piston provided with a transverse bearing; a wrist pin mounted in said bearing; and a connecting rod provided with a split journal, said wrist pin having opposed annular internal grooves in which said split journal is expanded, the portions of said journal engaging said grooves comprising laterally extending annular tongues, said wrist pin having an opening of a size and form permitting insertion of the journal into the pin before expansion of the journal while preventing withdrawal therefrom after expansion.

14. The combination of a piston provided with a transverse bearing; a wrist pin mounted in said bearing and provided with an internal bearing comprised of opposed series of annular coaxial grooves; a connecting rod provided with an expansible journal having a plurality of series of annular tongues adapted to engage the grooves of said wrist pin, said wrist pin having an opening of such size and form as to permit insertion of the journal in collapsed condition into the internal bearing; and means maintaining the journal in expanded condition in said internal bearing.

15. In combination with a piston having a detachable head and a transverse bearing, a wrist pin mounted in said bearing and provided with an internal bearing comprised of a plurality of annular coaxial grooves; a connecting rod provided with an expansible journal having annular tongues adapted to engage the internal bearing of the wrist pin; and means co-operating with said journal for expanding the latter into the internal bearing and for maintaining said journal in expanded condition, said means being accessible from the upper part of the piston when the piston head is detached.

16. In a piston having a detachable head and a transverse bearing, a wrist pin provided with an internal bearing formed by alternate coaxial tongues and grooves; a connecting rod provided with an expansible journal having laterally projecting alternate coaxial tongues and grooves respectively engaging the grooves and tongues of said bearing; and means maintaining said journal expanded in said internal bearing, said means being insertable from the upper part of the piston into the wrist pin and journal to expand the latter into the internal bearing.

17. In a piston having a detachable head and a transverse bearing, a wrist pin provided with an internal bearing formed by alternate coaxial tapered tongues and grooves; a connecting rod provided with an expansible journal having laterally projecting alternate coaxial tapered tongues and grooves respectively engaging the grooves and tongues of said bearing; and means maintaining said journal expanded in said internal bearing, said means being insertable from the upper part of the piston into the wrist pin and journal to expand the latter into the internal bearing.

18. A joint comprising a wrist pin having an internal bearing formed by opposed arcuate grooves; a connecting rod having a split journal expanded in the internal bearing and engaging the latter by means of laterally projecting tongues, said wrist pin having an opening of a size permitting insertion of the journal before expansion and preventing withdrawal after expansion; and means maintaining the journal expanded in the internal bearing.

19. A joint comprising a wrist pin having an internal bearing formed by opposed tapered arcuate grooves; a connecting rod having a split journal expanded in the internal bearing and engaging the latter by means of laterally projecting tapered tongues, said wrist pin having an opening of a size permitting insertion of the journal before expansion and preventing withdrawal after expansion; and means maintaining the journal expanded in the internal bearing.

20. A joint comprising a wrist pin having an internal bearing formed by opposed annular grooves; a connecting rod having a split journal expanded in the internal bearing and engaging the latter by means of laterally projecting annular tongues, said wrist pin having an opening of a size permitting insertion of the journal before expansion and preventing withdrawal after expansion; and means maintaining the journal expanded in the internal bearing.

21. A joint comprising a wrist pin and a connecting rod having co-operating bearing members formed by opposed series of coaxial tongues engaging co-operating series of coaxial grooves, one of said bearing members being expansible to permit ready assembly of the bearing members; and means for removably holding said expansible member in bearing contact with the other bearing member.

22. A joint comprising a wrist pin and a connecting rod having co-operating bearing members formed by opposed series of coaxial tapered tongues engaging co-operating series of coaxial tapered grooves, one of said bearing members being expansible to permit ready assembly of the bearing members; and means for removably holding said expansible member in bearing contact with the other bearing member.

23. A joint comprising a wrist pin and a connecting rod having co-operating bearing members formed by opposed series of annular coaxial tongues engaging co-operating series of annular coaxial grooves, one of said bearing members being expansible to permit ready assembly of the bearing members; and means for removably holding said expansible member in bearing contact with the other bearing member.

24. A connecting rod adapted for use in a piston construction having a wrist pin provided with a bearing, said connecting rod having an expansible journal member formed by a split end portion having a series of coaxial alternate grooves and tongues, said connecting rod having means for expanding said journal end to maintain the bearing members thereof in engagement with the wrist pin bearing.

25. A connecting rod adapted for use in a piston construction having a wrist pin provided with a bearing, said connecting rod having an expansible journal member formed by a split end portion each part of which has a series of coaxial alternate grooves and tongues, said connecting rod having means for expanding said journal end to maintain the bearing members thereof in engagement with the wrist pin bearing.

26. A connecting rod adapted for use in a piston construction having a wrist pin provided with a bearing, said connecting rod having an expansible journal member formed by a split end portion each part of which has a series of coaxial alternate tapered grooves and tongues, said connecting rod having means for expanding said journal end to maintain the bearing members thereof in engagement with the wrist pin bearing.

27. A wrist pin having spaced bearing members formed with alternate coaxial annular tongues and grooves, said wrist pin being transversely perforated between the bearing members and at right angles to the axis of said bearing members.

28. A wrist pin having spaced bearing members formed with alternate coaxial annular tapered tongues and grooves, said wrist pin being transversely perforated between the bearing members and at right angles to the axis of said bearing members.

29. In combination with a piston provided with a transverse bearing; a wrist pin mounted in said bearing and provided with a horizontal bearing portion, the axis of which is at right angles to the axis of the piston bearing, and a connecting rod formed with an integral journal portion detachably mounted in said wrist pin bearing, the engaging members of said rod journal portion and said wrist pin bearing comprising a series of alternate annular coaxial grooves and tongues and an opposed series of alternate coaxial annular tongues and grooves, said connecting rod having freedom of movement relative to the piston and wrist pin in a direction at right angles to the axis of said horizontal bearing and said transverse piston bearing being formed with an aperture through which the connecting rod extends.

Signed by me this 18th day of April, 1931.

KINCHEN N. MATTHEWS